United States Patent
Schmednecht et al.

(10) Patent No.: US 6,247,875 B1
(45) Date of Patent: *Jun. 19, 2001

(54) METHOD AND APPARATUS UTILIZING A HOLLOW BEAM FOR CONSTRUCTING SUBTERRANEAN WALLS COMPRISED OF GRANULAR MATERIAL

(75) Inventors: Fred C. Schmednecht, Valparaiso, IN (US); Dana A. Schmednecht, 1312 Indiana Ave., LaPorte, IN (US) 46350

(73) Assignee: Dana A. Schmednecht, LaPorte, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/465,576

(22) Filed: Dec. 17, 1999

Related U.S. Application Data

(63) Continuation-in-part of application No. 09/030,703, filed on Feb. 25, 1998, now Pat. No. 6,030,150.

(51) Int. Cl.[7] .................................. E02D 5/18; E02D 5/56
(52) U.S. Cl. .......................... 405/267; 405/240; 405/241; 405/243
(58) Field of Search .................................. 405/240–243, 405/253, 267, 266, 233, 133

(56) References Cited

U.S. PATENT DOCUMENTS

| | | |
|---|---|---|
| 745,453 | 12/1903 | McBean . |
| 878,141 | 2/1908 | Jackson . |
| 986,819 | 3/1911 | McGranighan . |
| 1,665,798 | 4/1928 | Sipe . |
| 1,954,094 | 4/1934 | Newman . |
| 2,952,130 | 9/1960 | Mueller . |
| 3,303,656 | 2/1967 | Landau . |
| 3,416,322 | 12/1968 | Bodine . |
| 3,420,067 | 1/1969 | Bjerking . |
| 3,499,293 | 3/1970 | Kato . |
| 3,512,366 | 5/1970 | Turzillo . |
| 3,782,125 | 1/1974 | Holl . |
| 3,807,184 | * 4/1974 | Turzillo ................................ 405/238 |
| 3,822,557 | 7/1974 | Frederick . |
| 3,864,923 | * 2/1975 | Turzillo ................................ 405/238 |
| 3,973,408 | 8/1976 | Paverman . |
| 4,028,900 | 6/1977 | Muller . |
| 4,057,969 | 11/1977 | Rochmann . |
| 4,100,750 | 7/1978 | Labrue . |

(List continued on next page.)

*Primary Examiner*—Robert E. Pezzuto
*Assistant Examiner*—Alexandra K. Pechhold
(74) *Attorney, Agent, or Firm*—Leydig, Voit & Mayer, Ltd.

(57) ABSTRACT

A method and apparatus is provided for producing subterranean walls comprised of granular material. The apparatus comprises a beam for making insertions into and extractions out of the ground to form a series of voids therein. The beam includes a hollow interior portion which receives a supply of granular material. The beam also has a plurality of outwardly projecting spurs on the outer faces thereof for scarfing the sidewalls of the void as the beam is extracted. The apparatus also includes a disposable shoe which is removably attached to the open bottom portion of the beam to prevent earthen material from entering the hollow interior portion of the beam as the beam is inserted into the ground. An actuating mechanism detaches the shoe from the open bottom portion of the beam after the beam has been inserted into the ground so that granular material is released into the void as the beam is extracted therefrom. The method comprises the following steps: suspending the beam above the ground; removably installing a disposable shoe onto the open bottom portion of the beam; inserting the beam and the removably installed shoe into the ground to form a void therein; delivering granular material to the hollow interior portion of the beam; detaching the shoe from the bottom portion of the beam; and extracting the beam from the ground while the spurs cut vertical channels in the sidewalls of the void and granular material flows through the open bottom portion thereof to fill the void with granular material.

40 Claims, 7 Drawing Sheets

U.S. PATENT DOCUMENTS

| | | |
|---|---|---|
| 4,126,007 | 11/1978 | Mars . |
| 4,249,836 | 2/1981 | Schmednecht . |
| 4,379,658 | 4/1983 | Schmednecht . |
| 4,585,678 | 4/1986 | Kunito . |
| 4,664,560 | 5/1987 | Cortlever . |
| 4,730,954 | 3/1988 | Sliwinski et al. . |
| 4,738,568 | 4/1988 | Steding . |
| 4,877,357 | 10/1989 | Verstraeten . |
| 5,007,770 | 4/1991 | Simmons et al. . |
| 5,137,394 * | 8/1992 | Tateno et al. ........................ 405/231 |
| 5,141,364 | 8/1992 | Degen et al. . |
| 5,188,485 * | 2/1993 | Forster et al. ........................ 405/232 |
| 5,240,348 | 8/1993 | Breaux . |
| 5,403,125 | 4/1995 | Andersen . |
| 5,584,610 | 12/1996 | Simpson et al. . |

* cited by examiner

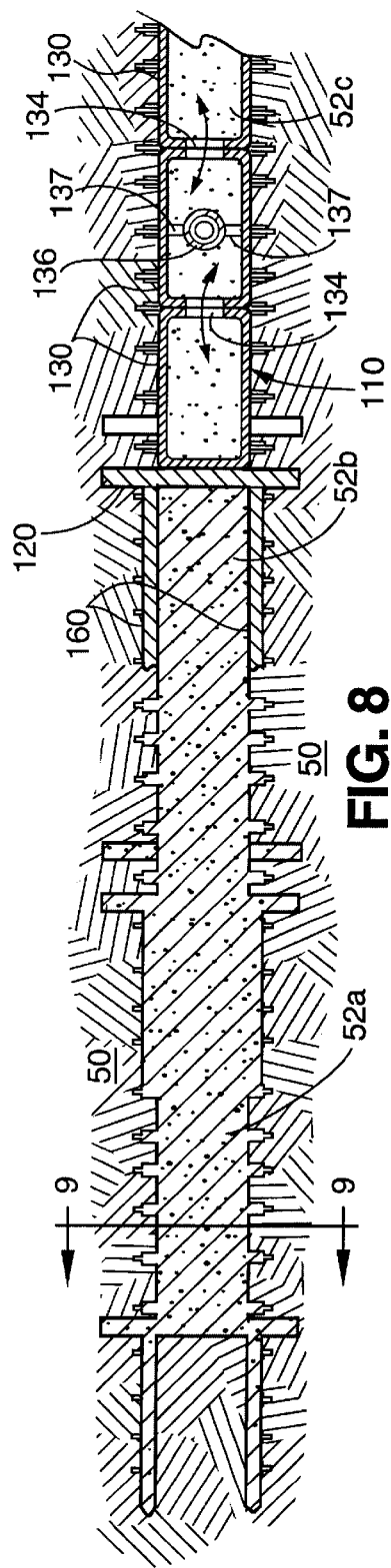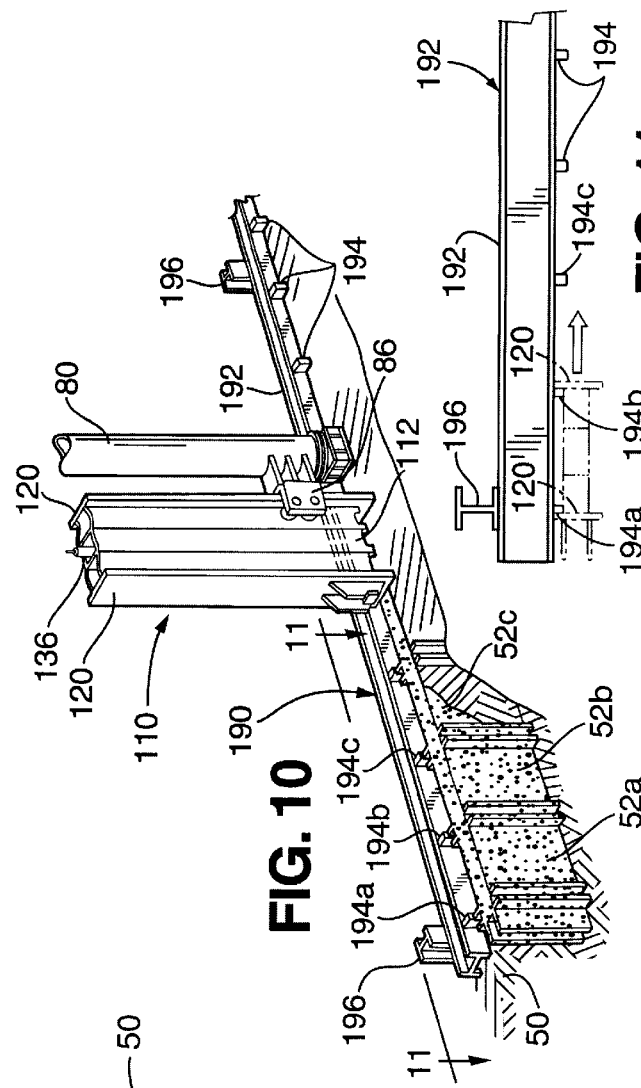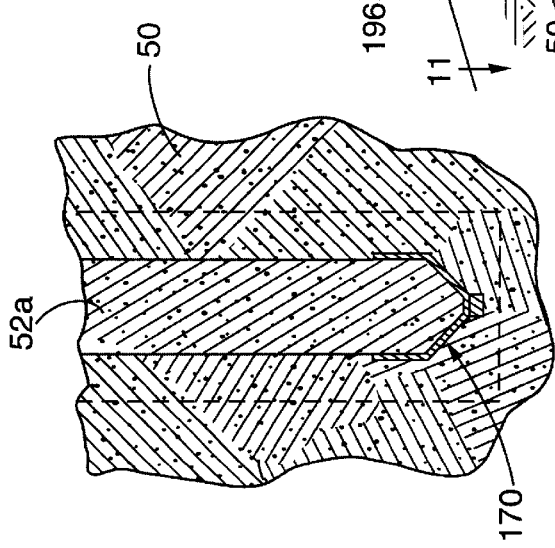

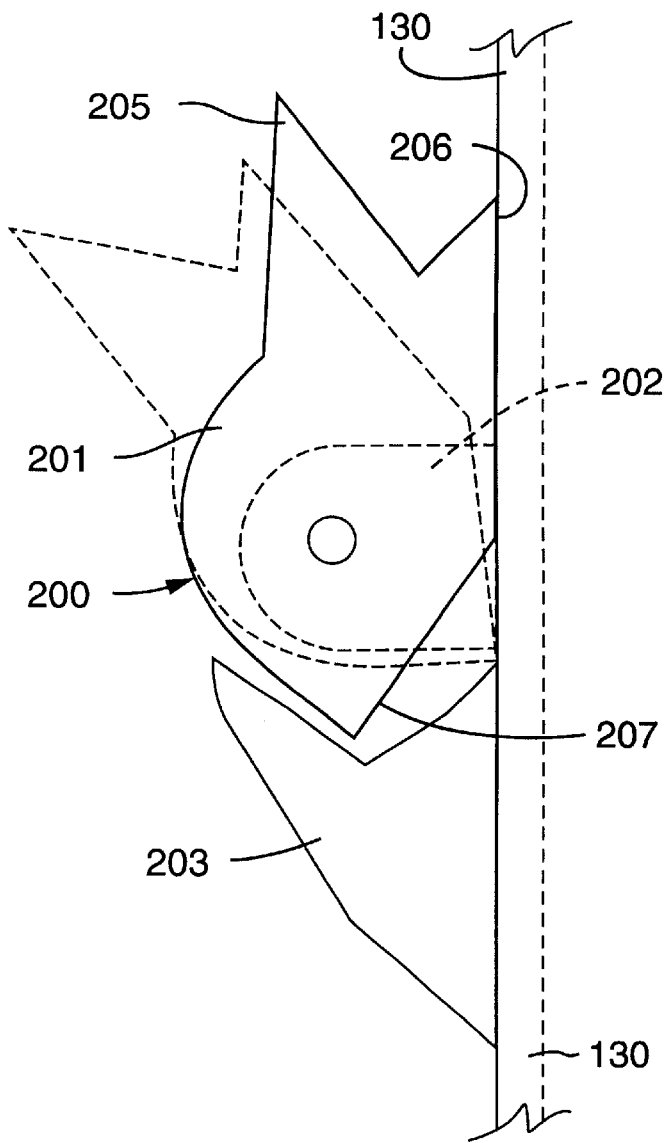
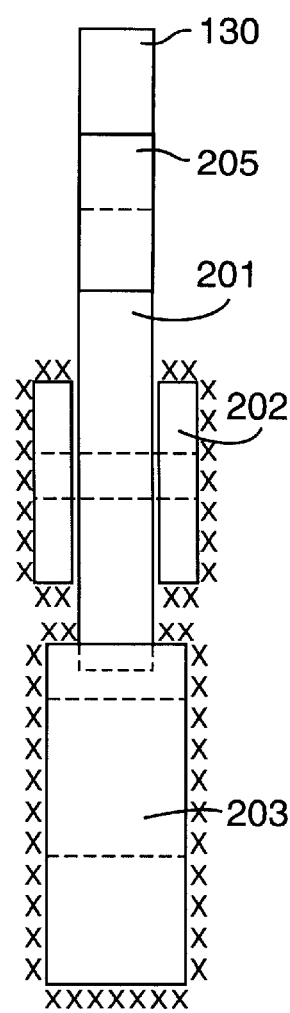
FIG. 15
FIG. 16

METHOD AND APPARATUS UTILIZING A HOLLOW BEAM FOR CONSTRUCTING SUBTERRANEAN WALLS COMPRISED OF GRANULAR MATERIAL

This application is a continuation-in-part of application Ser. No. 09/030,703, filed Feb. 25, 1998, now U.S. Pat. No. 6,030,150.

FIELD OF THE INVENTION

The present invention relates generally to subterranean walls and, more particularly, to a method and apparatus for constructing subterranean walls comprised of pervious granular material.

BACKGROUND OF THE INVENTION

It is frequently desirable to construct subterranean walls comprised of granular material. For example, it is known in the art that subterranean walls comprised of pervious granular iron material are particularly useful in treating certain pollutants in contaminated ground water, including, for example, trichloroethylene (T.C.E.) and other chlorinated solvents. Indeed, the oxidation of the granulated iron from such subterranean walls chemically neutralizes chlorinated solvents in the ground water. In this way, the granular iron from such subterranean walls acts as a corrective filter that treats the contaminated ground water.

While such subterranean walls are clearly useful in treating contaminated ground water, there are problems involved in their construction. For example, one known technique for constructing subterranean walls involves excavating a trench with a backhoe or the like, and then filling the trench with granular material. This particular technique, however, suffers from some obvious deficiencies. Namely, it is time consuming, labor intensive, expensive, and unsuited for use in constructing deep walls. In addition, this technique is also generally unreliable in terms of controlling the width of the wall.

OBJECTS OF THE INVENTION

Accordingly, a general object of the present invention is to provide a method and apparatus for constructing subterranean walls comprised of pervious granular material which overcomes these and other deficiencies of the prior art.

A more specific object of the present invention is to provide a method and apparatus for constructing subterranean walls comprised of granular iron material for use in treating contaminated ground water.

An even more detailed object of the present invention is to provide a method and apparatus utilizing a hollow beam with externally mounted scarfing elements for enhancing the passage of ground water into and through subterranean walls comprised of permeable granular material.

A further object of the present invention is to provide a method and apparatus of the foregoing type which lends itself to reliable operation and use.

SUMMARY OF THE INVENTION

In accordance with these and other objects of the present invention, a method and apparatus is provided for constructing subterranean walls comprised of granular material. The apparatus of the present invention comprises a beam for making insertions into and extractions out of the ground. More specifically, the beam includes a top portion which is attachable to a driver, an open bottom portion, and a hollow interior portion therebetween which receives a supply of granular material. In usage, the beam is inserted into the ground to form a void therein. The apparatus also includes a disposable shoe which is removably attached to the open bottom portion of the beam. In usage, the shoe prevents earthen material from entering the hollow interior portion of the beam as the beam is inserted into the ground. The apparatus further includes an actuating mechanism which detaches the shoe from the open bottom portion of the beam after the beam has been inserted into the ground so that granular material is released into the void as the beam is extracted therefrom.

In the preferred embodiment, the hollow beam is provided with scarfing elements to cut through the compacted sidewall surfaces of the void created as the beam is withdrawn in order to enhance the passage of water into and through the wall.

The method of the present invention comprises the following steps: suspending the beam above the ground; removably installing a disposable shoe onto the open bottom portion of the beam; inserting the beam and the removably installed shoe into the ground to form a void therein; delivering granular material to the hollow interior portion of the beam; detaching the shoe from the bottom portion of the beam; and extracting the beam from the ground while granular material flows through the open bottom portion thereof to fill the void with granular material. These steps may be repeated a desired number of times to produce a subterranean wall comprised of granular material and defined by successive overlapping voids filled with granular material. The scarfing elements on the hollow beam not only cut into the skin-like layer of compacted sidewall soil, but also leave residual vertical channels to enhance the flow of ground water into and out of the granular material of the subterranean wall.

These and other objects, features, and advantages of the present invention will become more readily apparent upon reading the following detailed description of the preferred embodiments, and upon reference to the accompanying drawings wherein:

BRIEF DESCRIPTION OF THE DRAWINGS

FIG. 8 is a fragmentary top plan view of a subterranean wall comprised of granular material and being constructed with the apparatus depicted in FIGS. 1–7;

FIG. 9 is a fragmentary cross-sectional view of a lower end of the subterranean wall depicted in FIG. 8, as seen substantially in the direction of line 9—9;

FIG. 10 is a fragmentary perspective view of the beam and apparatus depicted in FIGS. 1–7, showing a subterranean wall comprised of granular material under construction and showing a template for use in guiding the beam during successive insertions into the ground and extractions therefrom;

FIG. 11 is a fragmentary, schematic, top plan view of the template depicted in FIG. 10, as seen substantially in the direction of line 11—11;

FIG. 15 is a greatly enlarged, fragmentary, side elevational view of one of the scarfing elements of the present invention;

FIG. 16 is a greatly enlarged, fragmentary, front elevational view of one of the scarfing elements of the invention.

Figures 1, 2:
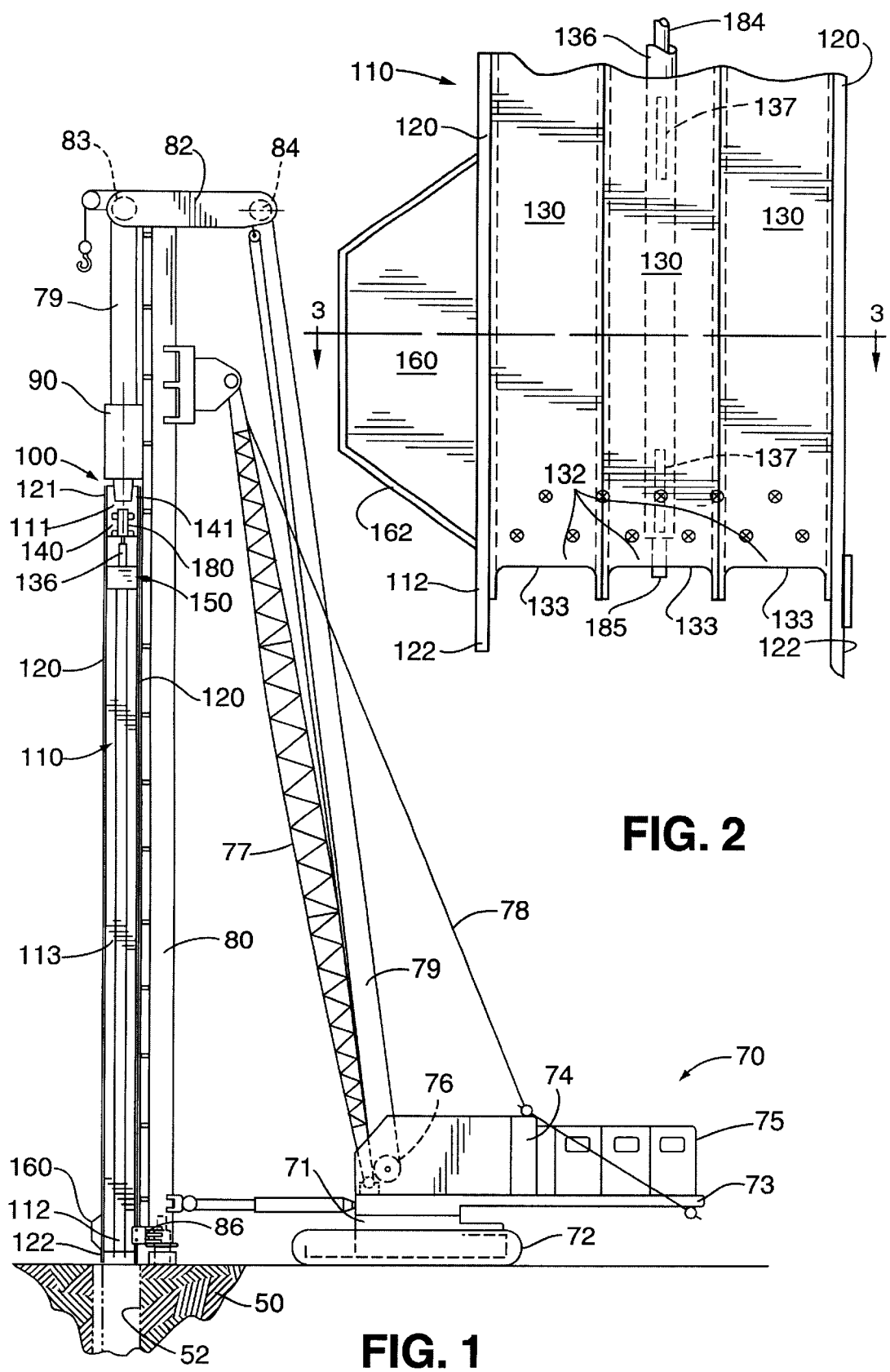
FIG. 1 is a side elevational view of an apparatus in accordance with the present invention for constructing subterranean walls comprised of granular material.
FIG. 2 is an enlarged, fragmentary, side elevational view of the apparatus depicted in FIG. 1, showing a bottom portion of a beam for the apparatus.

While the invention is susceptible to various modifications and alternative constructions, certain preferred embodiments thereof have been shown in the drawings and will be described in detail below. It should be understood, however, that there is no intention to limit the invention to the disclosed structural forms. On the contrary, the intention is to cover all modifications, alternative constructions, and equivalents that fall within the scope and spirit of the present invention as defined by the appended claims.

DETAILED DESCRIPTION OF THE PREFERRED EMBODIMENTS

Turning now to the drawings, and more particularly to FIGS. 1–7, an apparatus in accordance with the present invention for constructing subterranean walls comprised of granular material is generally designated by reference numeral 100. The subject apparatus 100 comprises a beam or mandrel 110 for making insertions into and extractions out of the ground 50. As best shown in FIG. 1, the beam 110 includes a top portion 111, an open bottom portion 112, and a hollow interior portion 113 therebetween which receives a supply of granular material. The apparatus 100 also comprises a disposable shoe 170 which is removably attached to the open bottom portion 112 of the beam 110 to prevent soil and other earthen material from entering the hollow interior portion 113 of the beam 110 as the beam 110 is being inserted into the ground 50 to form a void 52 therein. The apparatus 100 further includes an actuating mechanism 180 which selectively detaches the shoe 170 from the open bottom portion 112 of the beam 110 after the beam 110 has been inserted into the ground 50 so that granular material is released into the void 52 as the beam 110 is extracted therefrom.

In keeping with an important aspect of the present invention, the apparatus 100 may be utilized to construct subterranean walls comprised of pervious granular material. By way of non-limiting example, one particularly useful application of the apparatus 100 involves constructing subterranean walls comprised of pervious granular iron material or "iron sand." Such granular iron walls are particularly useful in treating certain pollutants in contaminated ground water including, for example, trichloroethylene (T.C.E.) and other chlorinated solvents. For instance, a subterranean wall formed by the apparatus 100 of the present invention and comprised of granular iron material or "iron sand" acts as a corrective filter which neutralizes chlorinated solvents in the ground water. In particular, the oxidation of the iron from the pervious granular iron wall chemically neutralizes chlorinated solvents in the ground water.

While one particularly useful application of the present invention has been described herein, the apparatus 100 of the present invention should not be construed as being limited to an apparatus for constructing subterranean walls comprised of pervious granular iron material or "iron sand." On the contrary, those skilled in the art will readily appreciate that the apparatus 100 of the present invention may alternatively be employed to construct subterranean walls comprised of other granular materials without departing from the scope or spirit of the present invention.

In order to construct a subterranean wall comprised of granular material with the apparatus 100 of the present invention, it is typically necessary to make a plurality of successive overlapping voids 52 in the ground 50. Of course, to make such voids 52, the beam 110 must be inserted into and extracted out of the ground 50 in a successively overlapping manner. In other words, several overlapping passes of the beam 110 must be employed.

In the illustrated embodiment, the beam 110 is inserted into the ground 50 with a vibratory unit or driver 90, as disclosed, for example, in U.S. Pat. No. 4,249,836 (Schmednecht). As shown in FIG. 1, the vibratory driver 90 is attached to the top portion 111 of the beam 110 and applies a vibratory force thereto which causes the bottom portion 112 of the beam 110 to vibrate into the ground 50. In addition to this vibration, which may be on the order of about 1000 cycles per minute, the weight of the beam 110 and the attached vibratory driver 90 also causes the bottom portion 112 of the beam 110 to enter the ground 50. While a vibrated beam technique is described and illustrated herein for inserting the beam 110 into the ground 50, it will be readily appreciated by those skilled in the art that other techniques may alternatively be utilized to produce voids 52 in the ground 50. By way of non-limiting example, a driven pile technique may instead be used to insert the beam 110 into the ground 50. With this technique, a pile driver or similar unit applies a pounding force to the top portion 111 of the beam 110 which drives the bottom portion 112 of the beam 110 into the ground 50, as disclosed, for example, in U.S. Pat. No. 4,877,357 (Verstraeten). Of course, those skilled in the art will appreciate that still other drivers and affiliated techniques for inserting the beam 110 into the ground 50 may alternatively be used without departing from the scope or spirit of the present invention.

As the beam 110 is being inserted into and extracted from the ground 50, both the beam 110 and driver 90 are supported by lifting equipment, such as crane 70. As is customary in the art, the crane 70 includes a base portion 71 which is supported on crawler tracks 72, a frame portion 73 which supports a counterweight 74, one or more electric generator sets 75, a hoist drum 76, and a boom 77 which is pivotally mounted to a front end of the frame portion 73. In addition, a first hoist line 78 is provided for raising and lowering the boom 77 and a second hoist line 79 is provided for raising and lowering the vibratory driver 90 and the attached beam 110. A guide support structure 80 is also provided for aligning and slidably guiding the beam 110 as it enters the ground 50. As shown in FIG. 1, the guide support structure 80 is supported by the boom 77 and includes a generally horizontal member 82 at is upper end with front and rear sheaves 83 and 84 for hoist line 79. In addition, the guide support structure 80 also includes a roller guide box 86 at its lower end which guides the beam 110 into the ground 50 as the vibratory driver 90 applies a vibratory force thereto.

As best shown in FIGS. 2–3 and 5–7, the beam 110 includes a pair of transverse end plate members 120 which are mounted on either side thereof and extend along the length of the beam 110 between the top portion 111 and the bottom portion 112. In this way, each transverse end plate member 120 includes an upper end 121 near the top portion 111 of the beam 110 and a lower end 122 near the bottom portion 112 of the beam 110. In order to facilitate penetration of the bottom portion 112 of the beam 110 into the ground 50, the lower end 122 of one of the two transverse end plate members 120 is slightly longer than the other and includes a beveled edge 124, as shown in FIG. 2.

Figure 6:
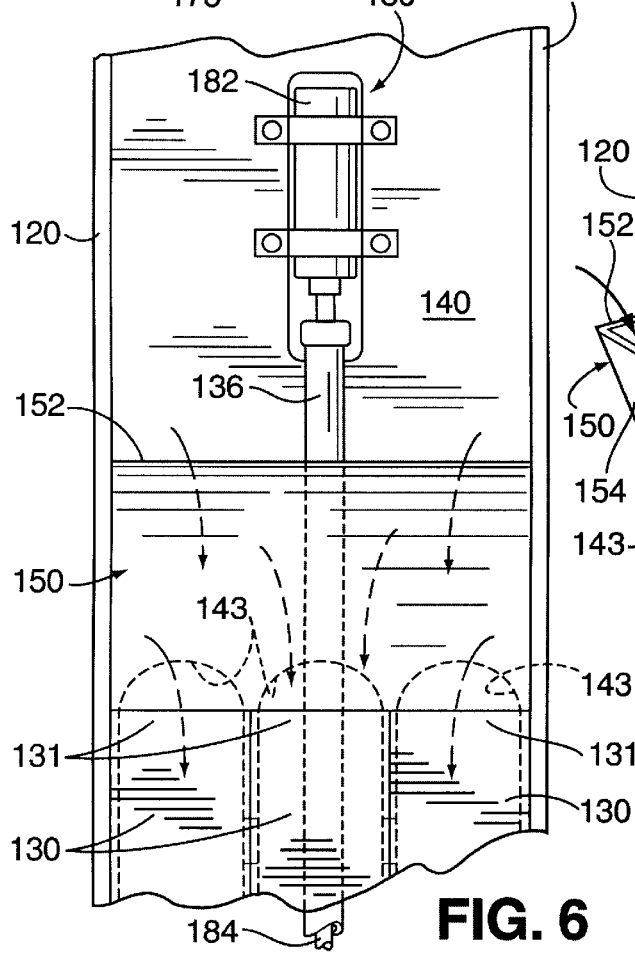
FIG. 6 is a fragmentary side elevational view of an intermediate portion of the beam, showing an actuating mechanism for use in removing the shoe from the bottom portion of the beam.

In the illustrated embodiment, a plurality of aligned and substantially open ended tubes or chambers 130 are joined together between the two transverse end plate members 120 to define the open bottom portion 112 and the hollow interior portion 113 of the beam 110. More specifically, each tube 130 has an open upper end 131 which defines an uppermost end of the hollow interior portion 113 of the beam 110, as shown in FIG. 6, and an open lower end 132 which defines the open bottom portion 112 of the beam 110, as shown in FIG. 2. In order to facilitate the flow of granular material through the open bottom portion 112 of the beam 110, the lower end 132 of each tube 130 includes scalloped or cut-away portion 133 on either side thereof.

Figure 3:
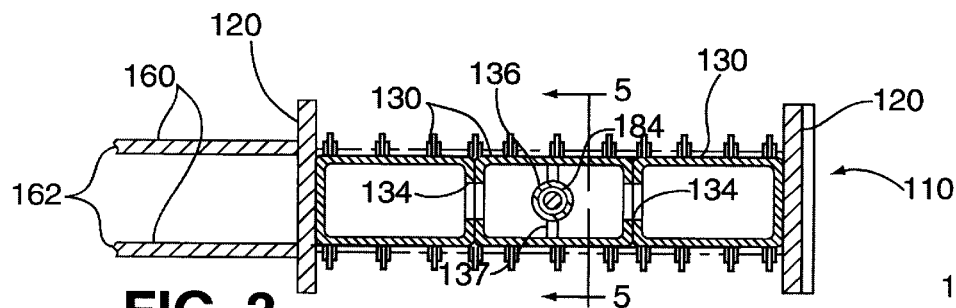
FIG. 3 is a cross-sectional view of the beam depicted in FIG. 2, as seen substantially in the direction of line 3—3.
Figure 7:
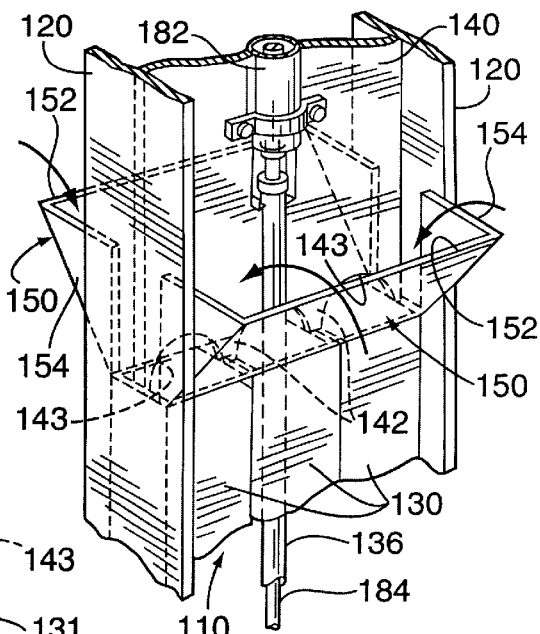
FIG. 7 is a fragmentary perspective view of the intermediate portion of the beam, showing a hopper for use in loading granular material into a hollow interior portion of the beam.

As best shown in FIGS. 3 and 7, three independent tubes 130 having generally rectangular cross-sectional configurations are welded together between the transverse end plate members 120 to form the hollow interior portion 113 of the beam 110. Notwithstanding this characterization, it will be readily appreciated by those skilled in the art that other quantities and configurations of tubes 130 are permissible and would certainly fall within the scope and spirit of the present invention. For example, instead of using three tubes 130, the hollow interior portion 113 of the beam 110 could alternatively be defined by a single hollow plenum structure.

In order to provide a structure to which the vibratory driver 90 may be conveniently attached, the beam 110 includes a central web. 140. In the illustrated embodiment, this central web 140 is arranged between the two transverse end plate members 120 and extends between the top portion 111 of the beam 110 and the upper ends 131 of the aligned tubes 130. In this way, the central web 140 includes an upper end 141 which is attachable to the vibratory driver 90, as shown in FIG. 1, and a lower end 142 which is. proximal to the upper ends 131 of the aligned tubes 130, as shown in FIG. 7.

A pair of hoppers 150 are provided above the upper end 131 of the aligned tubes 130 to facilitate the receipt of granular material by the hollow interior portion 113 of the beam 110. As best shown in FIG. 7, each hopper 150 includes an inclined plate member 152 which projects upwardly and outwardly away from the beam 110 at an angle with respect to the central web 140 and a pair of generally triangular side plate members 154 which extend between the inclined plate member 152 and the transverse end plate members 120. In usage, these hoppers 150 permit granular material to be conveniently poured into the hollow interior portion 113 of the beam 110 on either side thereof. In order to provide a substantially unobstructed flow of granular material through the upper ends 131 of the aligned tubes 130, the lower end 142 of the central web 140 includes three scallops 143 which correspond to and are substantially aligned with the three tubes 130, as shown in FIGS. 6 and 7. In addition, a plurality of spaced-apart holes 134 are formed through adjacent tubes 130, as shown, for example, in FIGS. 3 and 8, to allow cross-feeding of granular material between these tubes 130.

In order to guide the beam 110 as it is being inserted into the ground 50, a pair of spaced-apart and substantially parallel guide fin members 160 project outwardly from one of the transverse end plate members 130 near the bottom portion 112 of the beam 110. During an initial insertion of the beam 110 into the ground 50, these guide fin members 160 help guide the beam 110 through virgin soil. During subsequent insertions of the beam 110 into the ground 50, conversely, these guide fin members 160 are adapted to partially overlay the granular material within a previously formed void 52 which helps guide and center the beam 110 as it enters the soil, especially if the granular material within the previously formed void 52 is denser than the surrounding soil. In FIG. 8, for example, first and second voids 52a and 52b have already been formed and filled with granular material and a third void 52c is presently being formed. In this instance, the two guide fin members 160 partially overlay the granular material within the previously formed second void 52b which helps guide and center the beam 110 as it is being inserted into the ground 50. In order to minimize the mixing of soil and the granular material in a previously formed void, such as second void 52b in FIG. 8, each guide fin member 160 includes a lower beveled surface 162, as shown in FIG. 2, which pushes soil away from the granular material in the previously formed second void 52b as the beam 110 enters the ground 50 during the formation of this third void 52c.

Preferably, the individual component parts of the beam 110, including the transverse end plate members 120, the tubes 130, the central web 140, the hoppers 150, and the guide fin members 160, are made of a durable metallic material, such as high-grade steel, and are welded together. Although a steel beam 110 having a plurality of component parts is described herein, it will be readily appreciated by those skilled in the art that other constructions may alternatively be employed without departing from the scope or spirit of the present invention. In another embodiment, for example, the beam 110 could be formed of unitary construction and cast to shape.

In keeping with an important aspect of the present invention, the disposable shoe 170 of the present invention is installed onto the open bottom portion 112 of the beam 110 so that soil and other earthen material is prevented from entering the hollow interior portion 113 of the beam 110 while the beam 110 is being inserted into the ground 50. In the illustrated embodiment, the shoe 170 includes a pair of spaced-apart upper sidewall portions 172, a relatively narrow lower wall portion 174, and a pair of inclined wall portions 176 therebetween, as shown, for example, in FIG. 4. When the shoe 170 is installed onto the bottom portion 112 of the beam 110, the shoe 170 is adapted to fit snugly between the two transverse end plate members 130 of the beam 110, as shown in FIG. 2, and the upper sidewall portions 172 of the shoe 170 are adapted to tightly engage opposed outer sides of the aligned tubes 130, as shown in FIG. 5. The two inclined wall portions 176 provide the shoe 170 with a tapered profile which facilitates insertion of the beam 110 and attached shoe 170 into the ground 50. In order to provide sufficient strength, stiffness, and durability to the shoe 170, the lower wall portion 174 includes an external structural rib 175. In usage, this rib 175 opposes any bending forces that are applied to the shoe 170 as the beam 110 and shoe 170 are forcefully inserted into the ground 50.

In the preferred embodiment, the actuating mechanism 180 of the present invention comprises a linear actuator in the form of a hydraulic cylinder or jack 182 which is mounted to the central web 140 of the beam 110 and includes an extendible-retractable shaft 184 which is received by the middle tube 130. In usage, the hydraulic jack 182 moves the shaft 184 between a retracted position and an extended position. In the retracted position, a distal end 185 of the shaft 184 is spaced-apart from the lower wall portion 174 of the shoe 170, as shown, for example, in solid lines in FIG. 5. In the extended position, conversely, the distal end 185 of the shaft 184 is positioned to engage the lower wall portion 174 of the shoe 170, as shown, for example, in phantom lines in FIG. 5, and to push the shoe 170 off of the bottom portion 112 of the beam 110. In order to guide the shaft 184 in its movement and to protect the shaft 184 from any granular material within the hollow interior portion 113 of the beam 110, the shaft 184 is housed within a hollow pipe 136 which extends longitudinally downwardly within the middle tube 130 toward the bottom portion 112 of the beam 110, as shown in FIGS. 5–7. In the illustrated embodiment, this pipe 136 is supported against the inner sides of the middle tube 130 with a plurality of spaced-apart gussets 137, as shown in FIGS. 2 and 5, which are welded to both the inner sides of the tube 130 and to the outside of the pipe 136. While actuating mechanism 180 has been described herein as comprising a hydraulic jack 182 with an extendible-retractable shaft 184, it will be readily appreciated by those skilled in the art that the actuating mechanism 180 may alternatively comprise virtually any other type of linear actuator without departing from the scope or spirit of the present invention including, but not limited to, a pneumatic jack, a jack screw, a rack and pinion type gearing arrangement, or the like.

Figure 4:
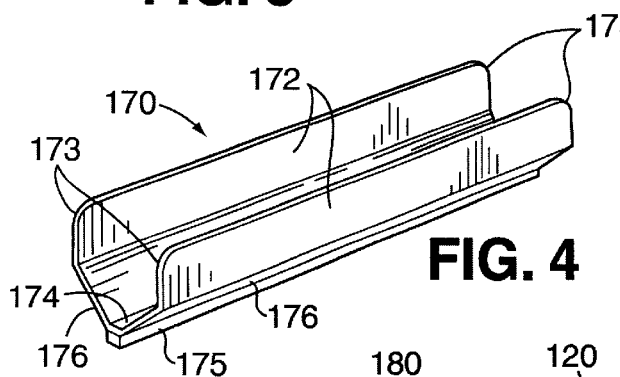
FIG. 4 is a perspective view of the a preferred form of a detachable shoe for installation on the bottom end of the beam.
Figure 5:
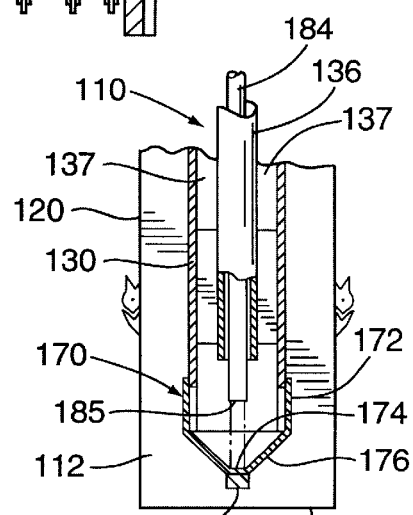
FIG. 5 is a fragmentary cross-sectional view of the beam depicted in FIG. 3, as seen substantially in the direction of line 5—5, and showing the shoe installed at he bottom portion thereof.

In order to facilitate removal of the shoe 170 from the bottom portion 112 of the beam 110 after it has been inserted into the ground 50, the upper sidewall portions 172 of the shoe 170 include rounded corners 173, as shown in FIG. 4. In usage, these rounded corners 173 restrict or minimize any binding that may occur between the upper sidewall portions 172 of the shoe 170 and the opposed outer sides of the aligned tubes 130 as the shoe 170 is being pushed off of the bottom portion 112 of the beam 110. Thus, even if the shoe 170 were to be pushed off of the bottom portion 112 of the beam 110 in a slightly misaligned manner, these rounded corners 173 would allow the shoe 170 to be removed therefrom.

In most instances, a plurality of passes or beam 110 insertions into and extractions out of the ground 50 are required to construct a subterranean wall comprised of granular material. In order to accurately guide the beam 110 during successive insertions into and extractions out of the ground 50 so that successive overlapping voids 52 are formed in the ground 50 along a predetermined course of travel, one or more pattern guide templates 190 may be arranged on the ground 50, as shown, for example in FIGS. 10 and 11. In the illustrated embodiment, the guide template 190 comprises a support member 192 in the form of a wide flange beam which is securely affixed to the ground 50 along the predetermined course of travel with anchors 196, and includes a plurality of equally spaced positioning lugs 194 formed along its length.

During an initial pass, the beam 110 is suspended above the ground 50 and a first shoe 170 is installed onto the bottom portion 112 of the suspended beam 110. Next, the two transverse end plate members 120 of the suspended beam 110 are positioned on either side of the first and second positioning lugs 194a and 194b of the template 190 and in engagement with the support member 192 of the template 190, as shown, for example, in phantom lines in FIG. 11. Thereafter, the beam 110 is then inserted into the ground 50 to form a first void 52a therein. Moreover, once the beam 110 has penetrated the ground 50 to a desired depth, granular material is poured into one or both of the hoppers 150 to fill the hollow interior portion 113 of the beam 110. Next, the linear actuator 182 is activated to move the shaft 184 from the retracted position toward the extended position such that the shoe 170 is detached or removed from the bottom portion 112 of the beam 110. Thereafter, the beam 110 is extracted from the ground 50 while granular material flows through the open bottom portion 112 of the beam 110 to fill the void 52a with granular material.

During a subsequent pass, the beam 110 is resuspended above the ground 50 and an additional shoe 170 is installed onto the bottom portion 112 of the suspended beam 110. Thereafter, the two transverse end plate members 120 of the suspended beam 110 are positioned on either side of the second and third positioning lugs 194b and 194c of the template 190 and in engagement with the support member 192 of the template 190. The beam 110 is then inserted into the ground 50 to form an overlapping second void 52b therein. In addition, once the beam 110 has penetrated the ground 50 to approximately the depth of the first void 52a, granular material is poured into the hollow interior portion 113 of the beam 110, the shoe 170 is detached from the bottom portion 112 of the beam 110, and the beam 110 is extracted from the ground 50 while granular material flows through the open bottom portion 112 of the beam 110 to fill the second void 52b with granular material.

In this way, the support member 192 and the positioning lugs 194 of the template 190 accurately guide the beam 110 as it is being inserted into and extracted from the ground 50 so that successive overlapping voids 52 and a corresponding subterranean wall are formed in the ground 50 along a predetermined course of travel. In order to ensure that there are no gaps or discontinuities between consecutive voids, such as voids 52b and 52c in FIG. 8, the positioning lugs 194 of the template 190 are specifically adapted to locate the beam 110 such that during the formation of void 52c, for example, the beam 110 partially overlaps the previously formed void 52b. In fact, the amount of this overlap is defined by the size of the positioning lugs 194.

While the beam 110 of the present invention is shown being inserted into the ground 50 in a substantially vertical manner, those skilled in the art will readily appreciate that the beam 110 may alternatively be inserted into the ground 50 at other orientations without departing from the scope or spirit of the present invention. In some situations, for example, it may be desirable to successively insert the beam 110 into the ground 50 at a predetermined angle with respect to ground level, so that successive overlapping inclined voids 52 and a corresponding subterranean inclined wall are formed in the ground 50. In such situations, the angle of the beam 110 could be established with an inclinometer, a laser, or the like.

A method of constructing subterranean walls comprised of granular material and utilizing the apparatus 100 of the present invention will now be explained in greater detail. During a first pass, the beam 110 is suspended above the ground 50, as shown, for example, in FIG. 1. In the illustrated set-up, the beam 110 is suspended above the ground 50 by winding hoist line 79 around drum 76 until a sufficient gap exists between the bottom portion 112 of the beam 110 the ground 50. While the beam 110 and is suspended above the ground 50 in this manner, a first disposable shoe 170 is removably installed onto the open bottom portion 112 of the beam 110, as shown, for example, in FIG. 5. In order to properly position the beam 110 and shoe 170 relative to the predetermined course of travel, the two transverse end plate members 120 of the beam 110 are then positioned on either side of the first and second positioning lugs 194a and 194b of the template 190 and in engagement with the support member 192 of the template 190. Thereafter, the beam 110 is slowly lowered toward the ground 50, with the two transverse end plate members 120 of the beam 110 engaging the first and second positioning lugs 194a and 194b and the support member 192 of the template 190, until the beveled edge 124 of the longer transverse end plate member 120 partially penetrates the ground 50 and the rib 175 of the shoe 170 comes into contact with the ground 50.

At this point, the beam 110 and the removably installed shoe 170 are inserted into the ground 50 to form a first void 52a therein. In the illustrated set-up, the beam 110 and shoe 170 are inserted into the ground 50 a predetermined depth or distance by activating the vibratory driver 90 attached to the top portion 111 of the beam 110 and by selectively unwinding hoist line 79. As the beam 110 is being inserted into the ground 50, the roller guide box 86 at the lower end of the guide support 80 engages one of the transverse end plate members 120 of the beam 110, as shown, for example, in FIG. 10, to guide the beam 110 into the ground 50 as the vibratory driver 90 applies a vibratory force to the top portion 111 thereof. With other set-ups, however, the beam 110 and shoe 170 could be inserted into the ground 50 by other means including, for example, driving the beam 110 into the ground 50 with a pile driver or the like. In any event, the removably installed shoe 170 covers the open bottom portion 112 of the beam 110 and advantageously prevents soil and other earthen material from entering the hollow interior portion 113 of the beam 110 while the beam 110 is being inserted into the ground 50. Of course, until the beam 110 is extracted from the ground 50, the beam 110 occupies the volume of void 52a.

Upon reaching a predetermined depth, a supply of granular material, such as granular iron, is delivered to the hollow interior portion 113 of the beam 110. More specifically, granular material is poured into one or both of the hoppers 150 for discharge through the aligned tubes 130 by force of gravity. Once the hollow interior portion 113 of the beam 110 is fully loaded with granular material, the beam 110 is then lifted a short distance above the bottom of the void 52a. Next, the linear actuator 182 is activated which moves the shaft 184 from its retracted position toward its extended position to remove the shoe 170 from the bottom portion 112 of the beam 110 by pushing it away therefrom. Once removed, the shoe 170 falls to the bottom of the void 52a by force of gravity while granular material from the hollow interior portion 113 of the beam 110 discharges through the now open bottom portion 112 of the beam 110 to cover the shoe 170. At this point, additional granular material may be poured into the hoppers 150, if needed, to replenish the granular material discharged into the bottom of the void 52a. Next, the beam 110 is slowly extracted from the ground 50 by winding hoist line 79 around drum 76 while granular material flows through the open bottom portion 113 of the beam 110 to fill the void 52a with granular material. Of course, as the beam 110 is being extracted from the ground 50, additional granular material may be periodically poured into the hollow interior portion 113 of the beam 110, as needed. In any event, once the beam 110 has been fully extracted from the ground 50, the void 52a is substantially filled with granular material, as shown, for example, in FIGS. 8–11.

During a subsequent or second pass, the crane 70 and guide lead 80 supporting the suspended beam 110 are moved in a direction corresponding to the predetermined course of travel so that the beam 110 is suspended above the previously formed void 52a in a partially overlapping manner with respect thereto. Next, an additional shoe 170 is removably installed onto the bottom portion 112 of the beam 110. In order to ensure that the beam 110 and shoe 170 partially overlay the previously formed void 52a in a direction along the predetermined course of travel, the two transverse end plate members 120 of the beam 110 are then positioned on either side of the second and third positioning lugs 194b and 194c of the template 190 and in engagement with the support member 192 of the template 190. Thereafter, the beam 110 is slowly lowered toward the ground 50, with the two transverse end plate members 120 of the beam 110 engaging the second and third positioning lugs 194b and 194c and the support member 192 of the template 190, until the beveled edge 124 of the longer transverse end plate member 120 partially penetrates the ground 50 and the rib 175 of the shoe 170 comes into contact with both the ground 50 and the previously formed void 52a.

At this point, the beam 110 and shoe 170 are inserted into the ground 50 to form a second void 52b therein which lies along the predetermined course of travel and partially overlaps the previously formed void 52a. As the beam 110 and shoe 170 are inserted into the ground 50, the two guide fin members 160 of the beam 110 partially overlay the granular material occupying the previously formed void 52a which helps guide and center the beam 110 as it enters the soil. Of course, the granular material occupying the overlaid portion of the previously formed void 52a is pushed downwardly into the ground 50 ahead of the beam 110 and shoe 170. In any event, once the beam 110 and shoe 170 have been inserted to approximately the depth of the previously formed void 52a, a fresh supply of granular material is poured into one or both of the hoppers 150 to fill the hollow interior portion 113 of the beam 110 with granular material. After the beam 110 has been lifted a short distance above the bottom of the void 52b, the shaft 184 of linear actuator 182 is extended to detach the shoe 170 from the bottom portion 112 of the beam 110. Thereafter, the beam 110 is slowly extracted from the ground 50 while granular material flows through the open bottom portion 113 of the beam 110 to fill the void 52b with granular material. In order to ensure that the void 52b is substantially filled with granular material after the beam 110 has been fully extracted from the ground 50, additional granular material may be periodically supplied to the hollow interior portion 113 of the beam 110 as the beam 110 is being extracted therefrom.

Depending on the desired length of the subterranean wall under construction, additional passes or beam 110 insertions into and extractions out of the ground 50 may need to be performed. If so, the steps described above in connection with the second pass of the beam 110 would be repeated a desired number of times to produce a subterranean wall comprised of granular material and defined by successive overlapping voids 52 filled with granular material. In FIG. 8, for example, the beam 110 is shown forming and filling third void 52c. During this pass, the same procedural steps that were applied to form and fill the second void 52b are being applied to form and fill the third void 52c. Before this and each ensuing pass, however, the beam 110 would need to be moved in a direction corresponding to the predetermined course of travel so that the beam 110 is suspended above the previously formed void in a partially overlapping manner with respect thereto. Of course, the template 190 would aid in properly overlapping beam 110 and in guiding the beam 110 and shoe 170 as they are being inserted into the ground 50.

In some situations, it may be desirable to construct a subterranean wall comprised of a mixture of granular material and a biodegradable slurry material. Such a wall could be constructed with the apparatus 100 of the present invention, or a variation thereof, by pumping a desired mixture of granular material and biodegradable slurry material into the hollow interior portion 113 of the beam 110, in lieu of pouring granular material into the hollow interior portion 113 of the beam 110, and by forcing the mixture through the open bottom portion 112 of the beam 110.

In some situations, the makeup of the underground soil, in which the subterranean wall is to be installed, is such that the insertion and retraction of the beam 110 causes the soil along the sidewalls of the void to compact and densify to such a degree that a glaze or skin-like surface is formed on the sidewalls of the void. This, of course, is undesirable in those instances where the purpose of installing the subterranean wall is to fill the void with pervious granular material which acts to filter the ground water that passes from one side of the subterranean wall to the other. In other words, the formation of such a glaze or skin-like surface on the sidewalls of the void creates a less permeable layer that impedes the passage of water from the ground on one side of the subterranean wall, through the permeable filter material, and into the ground on the other side of the wall.

In accordance with a particularly preferred embodiment of the invention, the beam 110 is provided with means for scraping or "scarfing" the sidewall surfaces of the void as the beam is retracted from the ground in order to cut through the glaze or skin-like surface that would otherwise be formed. Desirably, this scarfing action not only interrupts or cuts through the sidewall glaze or skin-like surfaces of the void, but also forms residual, vertically extending channels that further enhance the passage of ground water from the soil on one side of the filter material of the subterranean wall to the other. Preferably, the elements that perform this scarfing action are arranged so that they penetrate further through the sidewalls of the void as the beam is being retracted than as the beam is being inserted into the ground. This enhances the breakup of the glaze or skin-like layer that is formed at least in part, as a result of initially driving the beam into the ground.

Figure 12:
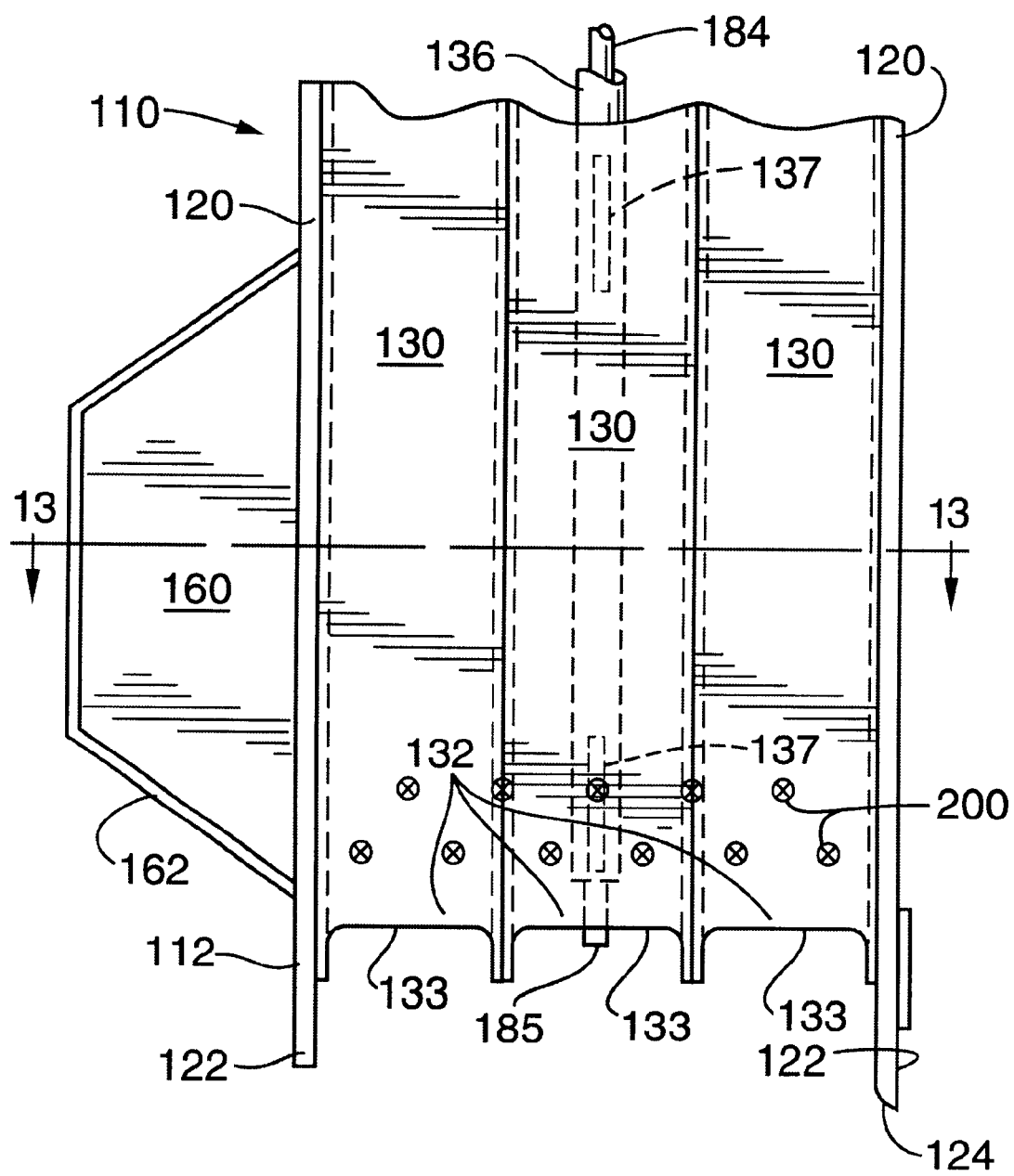
FIG. 12 is an enlarged, fragmentary, side elevational view of the bottom portion of the beam, similar to FIG. 2, showing schematically the location of the scarfing elements of the present invention.

Turning now to FIGS. 12–17, a preferred form of the scarfing elements 200 of the present invention is shown. As illustrated diagrammatically in FIG. 12, a plurality of scarfing elements 200 are mounted on the outer faces of the lateral sides of the beam 160 adjacent the lower end 112 thereof. In the preferred embodiment, the scarfers 200 are disposed in two vertically spaced rows, with the scarfer elements 200 of one row disposed in staggered relation to those of the other row. Thus, as illustrated in FIG. 12, five scarfer elements are located in the upper row, with one scarfer 200 disposed essentially at the center of each of the hollow tubes 130 and another scarfer disposed adjacent each of the joints of the abutting tubes. In the lower row, six scarfers are disposed in essentially equally spaced relation along the side of the beam 110, with two scarfers on each of the three hollow tubes 130.

Figure 13:
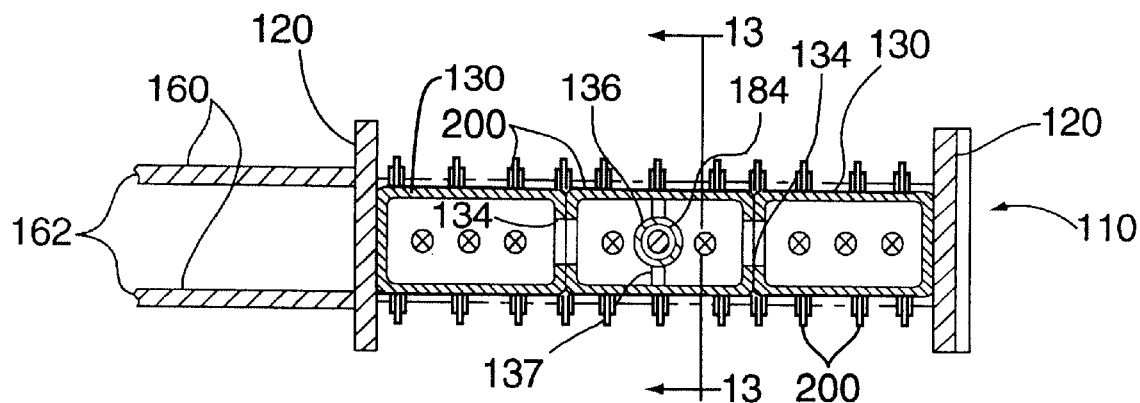
FIG. 13 is a cross-sectional view of the beam and scarfing elements of FIG. 12, as seen substantially in the direction of line 13—13.
Figure 14:
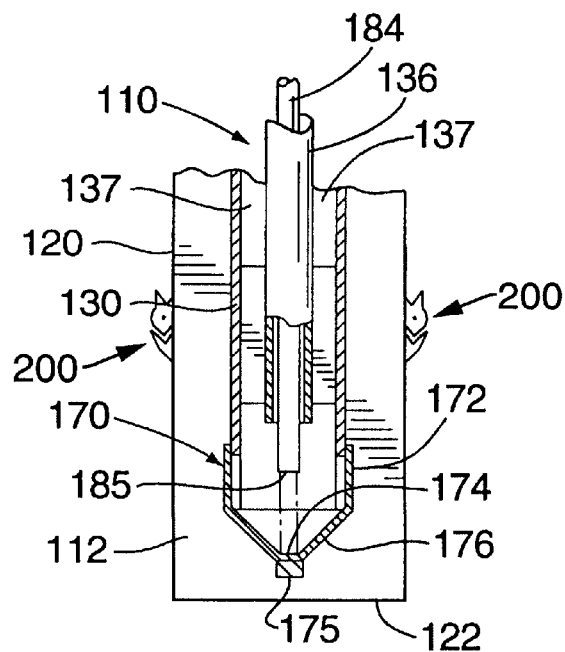
FIG. 14 is a fragmentary cross-sectional view of the beam depicted in FIG. 13, as seen substantially in the direction of line 13—13.

As shown in more detail in FIGS. 13 and 14 and in the enlarged views of FIGS. 15 and 16, each of the scarfers 200 of the preferred embodiment comprises a scarfer spur 201 rotatably mounted between a pair of lugs 202 welded to the outer sides of the hollow tubes 130. A generally triangular-shaped opening wedge 203 is preferably disposed below each spur 201 and is also welded to the hollow tube 130. It will be understood that each of the opening wedges 203 cuts a vertical channel in the sidewall of the void as the beam 110 is inserted into the ground. The opening wedges 203 thus shield the rotatable spurs 201 and their supporting shafts from excessive vertical forces and bending moments as the beam is inserted.

Pursuant to the invention, each of the rotatable spurs 201 is formed with a radially extending prong 205 that is disposed to point generally upwardly as the beam 110 is inserted into the ground and is arranged to pivot and project laterally out from the beam 110 as the beam is extracted. As best seen in FIG. 15, the illustrated spur 201 has a generally flat upper face portion 206 disposed to abut the outer surface of the tube 130 as the beam 110 is inserted in the ground. The spur 201 also is preferably formed with a generally flat lower face portion 207 disposed to abut the surface of the tube 130 as the beam is extracted from the ground. As shown by the dash-line position in FIG. 15, the prong 205 of the spur 201 is rotated counterclockwise to project laterally out from the sidewall of the tube 130 in order to penetrate into the sidewall of the void and cut through the compacted surface thereof as the beam 110 is withdrawn. This not only cuts or scarfs the otherwise glazed or skin-like layer on the sidewall of the void, but also forms a vertical channel to enhance the passage of water from the ground into the permeable filter material of the subterranean wall.

Figure 17:
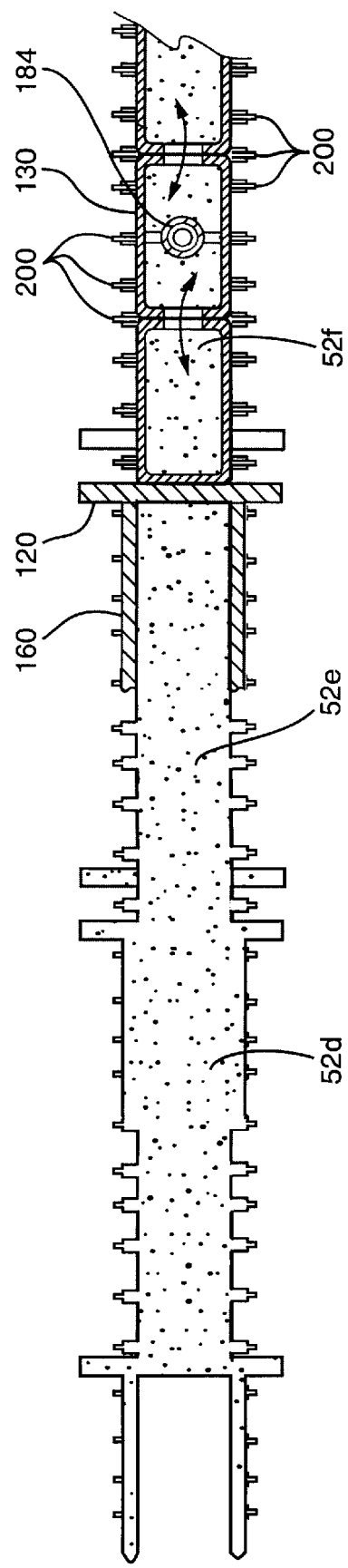
FIG. 17 is a fragmentary top plan view of a subterranean wall comprised of granular material and being constructed with a hollow beam having scarfing elements depicted in FIGS. 12–16.

Referring now to FIG. 17, a series of three successive insertions of the beam 110 including the scarfer elements 200 is illustrated, similar to that shown in FIG. 8. Thus, in FIG. 17, a first insertion and extraction of the beam 110 leaves a void 52d filled with permeable filter material and vertically extending residual channels are cut into the ground along both sides of the void. It will be understood, of course, that the channels depicted here are rather idealized and, in actual practice, the edges of the channels are not so precisely defined and may even crumble inwardly depending upon the condition of the compacted soil of the sidewall of the void. A second void 52e filled with permeable material is also shown in FIG. 17 with a third insertion of the beam 110, to form a third void 52f is shown in overlapping relation to the second void 52e. As previously explained, additional granular material may be periodically supplied to the hollow portion 113 of the beam 110 as the beam is being extracted from the ground.

While the present invention has been described and disclosed in connection with a preferred embodiment, it will be understood that there is no intention to limit the invention to the disclosed structural forms. On the contrary, the intention is to cover to cover all modifications, alternative constructions, and equivalents that fall within the scope and spirit of the present invention as defined by the following claims. In addition, all references cited herein are hereby incorporated by reference in their entireties.

What is claimed is:

1. An apparatus for constructing subterranean walls comprised of granular material, the apparatus comprising:

a beam for making successive overlapping insertions into and extractions out of the ground, the beam having a top portion which is attachable to a driver, an open bottom portion, and a hollow interior portion therebetween which receives a supply of granular material, the beam also including transverse end plate members mounted on either side thereof and extending between the top and bottom thereof, the beam being inserted into the ground and then extracted to form a void having opposed sidewalls therein;

means disposed on the outer faces of the beam adjacent the bottom portion thereof for scarfing the opposed sidewalls of the void as the beam is extracted from the ground;

a disposable shoe removably attached to the open bottom portion of the beam, the shoe preventing earthen material from entering the hollow interior portion of the beam while the beam is being inserted into the ground; and an actuating mechanism interposed between the beam and the shoe for selectively detaching the shoe from the open bottom portion of the beam after the beam has been inserted into the ground so that granular material is released into the void as the beam is extracted therefrom.

2. The apparatus set forth in claim 1, wherein the scarfing means comprises a plurality of scarfing spurs rotatably mounted on supporting lugs secured to the outer faces of the beam, each of the scarfing spurs having at least one radially extending prong disposed to point generally upwardly as the beam is inserted into the ground and is arranged to pivot and project laterally out from the beam as the beam is extracted.

3. The apparatus set forth in claim 2, wherein each of the scarfing spurs includes a generally flat portion adapted to abut the outer face of the beam and limit the rotation of the scarfing spur as the beam is extracted.

4. The apparatus set forth in claim 1 including an opening wedge mounted on the outer face of the beam below each of the scarfing means for substantially shielding the scarfing means from vertical forces and bending moments due to reaction with the ground as the beam is inserted.

5. The apparatus set forth in claim 4, wherein each of the opening wedges is generally triangle shaped and slopes upwardly and outwardly from the beam below the scarfing means.

6. The apparatus set forth in claim 1, wherein the hollow interior and bottom portions of the beam are defined by one or more open ended tubes arranged between the transverse end plate members, and wherein each tube has a generally rectangular cross-sectional configuration.

7. The apparatus set forth in claim 6 wherein the beam includes a central web arranged between the transverse end plate members and extending between the top portion of the beam and an upper end of the aligned tubes, and wherein the actuating mechanism comprises a linear actuator mounted to the central web and having a shaft which is received by one of the aligned tubes, the actuator moving the shaft between a retracted position wherein a distal end of the shaft is spaced-apart from the shoe and an extended position wherein the distal end of the shaft is positioned to push the shoe off of the bottom portion of the beam.

8. The apparatus set forth in claim 1, wherein the scarfing means is adapted to cut into the surface layer of the opposed sidewalls of the void and to form vertical channels therein as the beam is extracted.

9. The apparatus set forth in claim 1, wherein the scarfing means comprises a plurality of scarfing spurs rotatably mounted in multiple horizontal rows spaced vertically apart on each outer face of the beam with the scarfing spurs located on one row being disposed in staggered relation to the scarfing spurs located on the next vertically spaced row.

10. The apparatus set forth in claim 1, wherein the beam includes a pair of spaced-apart guide fin members which project outwardly from the bottom portion of the beam, the guide fin members being adapted to guide the beam as it is being inserted into the ground.

11. The apparatus set forth in claim 1, wherein the shoe is adapted to fit between the transverse end plate members of the beam.

12. An apparatus for constructing subterranean walls comprised of granular material, the apparatus comprising:

a beam for making successive overlapping insertions into and extractions out of the ground, the beam having a top portion which is attachable to a driver, an open bottom portion, and a hollow interior portion therebetween which receives a supply of granular material, the beam being inserted into the ground and then extracted to form a void having opposed sidewalls therein;

means disposed on the outer faces of the beam adjacent the bottom portion thereof for scarfing the opposed sidewalls of the void as the beam is extracted from the ground; and wherein the scarfing means is adapted to cut into the surface layer of the opposed sidewalls of the void and to form vertical channels therein as the beam is extracted;

a disposable shoe removably attached to the open bottom portion of the beam, the shoe preventing earthen material from entering the hollow interior portion of the beam while the beam is being inserted into the ground;

the shoe including a pair of spaced-apart upper side wall portions which are adapted to engage the bottom portion of the beam, a relatively narrow lower wall portion, and a pair of inclined wall portions therebetween; and an actuating mechanism interposed between the beam and the shoe for selectively detaching the shoe from the open bottom portion of the beam after the beam has been inserted into the ground so that granular material is released into the void as the beam is extracted therefrom.

13. The apparatus set forth in claim 12, wherein the scarfing means comprises a plurality of scarfing spurs rotatably mounted on supporting lugs secured to the outer faces of the beam, each of the scarfing spurs having at least one radially extending prong disposed to point generally upwardly as the beam is inserted into the ground and is arranged to pivot and project laterally out from the beam as the beam is extracted.

14. The apparatus set forth in claim 13, wherein each of the scarfing spurs includes a generally flat portion adapted to abut the outer face of the beam and limit the rotation of the scarfing spur as the beam is extracted.

15. The apparatus set forth in claim 12 including an opening wedge mounted on the outer face of the beam below each of the scarfing means for substantially shielding the scarfing means from vertical forces and bending moments due to reaction with the ground as the beam is inserted.

16. The apparatus set forth in claim 15, wherein each of the opening wedges is generally triangle shaped and slopes upwardly and outwardly from the beam below the scarfing means.

17. The apparatus set forth in claim 12, wherein the scarfing means comprises a plurality of scarfing spurs rotatably mounted in multiple horizontal rows spaced vertically apart on each outer face of the beam with the scarfing spurs located on one row being disposed in staggered relation to the scarfing spurs located on the next vertically spaced row.

18. A method of constructing subterranean walls comprised of granular material, the method comprising the steps of:
- (a) suspending a beam above the ground, the beam having a top portion, an open bottom portion, and a hollow interior portion therebetween, the beam also including laterally projecting scarfing means, transverse end plate members mounted on either side thereof and extending between the top and bottom portions thereof;
- (b) removably installing a disposable shoe onto the open bottom portion of the beam between the transverse end plate members of the beam;
- (c) inserting the beam and the removably installed shoe into the ground;
- (d) delivering granular material to the hollow interior portion of the beam;
- (e) selectively operating an actuating mechanism carried by the beam and interposed between the beam and the shoe to detach the shoe from the bottom portion of the beam; and
- (f) extracting the beam from the ground to form a void therein while the scarfing means cuts vertical channels into the sidewalls of the void and granular material flows through the open bottom portion of the beam to fill the void with granular material.

19. The method set forth in claim 18, further comprising the steps of:
- (a) re-suspending the beam above the ground;
- (b) removably installing an additional disposable shoe on the bottom portion of the beam;
- (c) positioning the beam so that it partially overlaps the previously formed void;
- (d) inserting the beam and the removably installed additional shoe into the ground to form an overlapping void therein;
- (e) delivering granular material to the hollow interior portion of the beam;
- (f) selectively operating the actuating mechanism to detach the additional shoe from the bottom portion of the beam; and
- (g) extracting the beam from the ground while the scarfing means cuts vertical channels into the sidewalls of the void and granular material flows through the open bottom portion thereof to fill the overlapping void with granular material.

20. The method set forth in claim 19, further comprising the steps of:
repeating steps (a) through (g) of claim 19 a desired number of times to produce a subterranean wall comprised of granular material and defined by successive overlapping voids filled with granular material.

21. An apparatus for constructing subterranean walls comprised of granular material, the apparatus comprising:
- a beam for making successive overlapping insertions into and extractions out of the ground, the beam having a top portion which is attachable to a driver, an open bottom portion, and a hollow interior portion therebetween which receives a supply of granular material, the beam also including transverse end plate members mounted on either side thereof and extending between the top and bottom portions thereof, the beam being inserted into the ground and then extracted to form a void having opposed sidewalls therein;
- at least one scarfer disposed on the outer faces of the beam adjacent the bottom portion thereof for scarfing the opposed sidewalls of the void as the beam is extracted from the ground;
- a disposable shoe removably attached to the open bottom portion of the beam, the shoe preventing earthen material from entering the hollow interior portion of the beam while the beam is being inserted into the ground; and
- an actuating mechanism interposed between the beam and the shoe for selectively detaching the shoe from the open bottom portion of the beam after the beam has been inserted into the ground so that granular material is released into the void as the beam is extracted therefrom.

22. The apparatus set forth in claim 21, wherein each scarfer comprises a scarfing spur rotatably mounted on supporting lugs secured to the outer faces of the beam, each of the scarfing spurs having at least one radially extending prong disposed to point generally upwardly as the beam is inserted into the ground and is arranged to pivot and project laterally out from the beam as the beam is extracted.

23. The apparatus set forth in claim 22, wherein each of the scarfing spurs includes a generally flat portion adapted to abut the outer face of the beam and limit the rotation of the scarfing spur as the beam is extracted.

24. The apparatus set forth in claim 21 including an opening wedge mounted on the outer face of the beam below each scarfer for substantially shielding the scarfer from vertical forces and bending moments due to reaction with the ground as the beam is inserted.

25. The apparatus set forth in claim 24, wherein each of the opening wedges is generally triangle shaped and slopes upwardly and outwardly from the beam below the scarfer.

26. The apparatus set forth in claim 21, wherein the hollow interior and bottom portions of the beam are defined by one or more open ended tubes arranged between the transverse end plate members, and wherein each tube has a generally rectangular cross-sectional configuration.

27. The apparatus set forth in claim 26 wherein the beam includes a central web arranged between the transverse end plate members and extending between the top portion of the beam and an upper end of the aligned tubes, and wherein the actuating mechanism comprises a linear actuator mounted to the central web and having a shaft which is received by one of the aligned tubes, the actuator moving the shaft between a retracted position wherein a distal end of the shaft is spaced-apart from the shoe and an extended position wherein the distal end of the shaft is positioned to push the shoe off of the bottom portion of the beam.

28. The apparatus set forth in claim 21, wherein each scarfer is adapted to cut into the surface layer of the opposed sidewalls of the void and to form vertical channels therein as the beam is extracted.

29. The apparatus set forth in claim 21 comprising a plurality of scarfers and corresponding scarfing spurs, wherein the scarfing spurs are rotatably mounted in multiple horizontal rows spaced vertically apart on each outer face of the beam with the scarfing spurs located on one row being disposed in staggered relation to the scarfing spurs located on the next vertically spaced row.

30. The apparatus set forth in claim 21, wherein the beam includes a pair of spaced-apart guide fin members which project outwardly from the bottom portion of the beam, the guide fin members being adapted to guide the beam as it is being inserted into the ground.

31. The apparatus set forth in claim 21, wherein the shoe is adapted to fit between the transverse end plate members of the beam.

32. An apparatus for constructing subterranean walls comprised of granular material, the apparatus comprising:

a beam for making successive overlapping insertions into and extractions out of the ground, the beam having a top portion which is attachable to a driver, an open bottom portion, and a hollow interior portion therebetween which receives a supply of granular material, the beam being inserted into the ground and then extracted to form a void having opposed sidewalls therein;

at least one scarfer disposed on the outer faces of the beam adjacent the bottom portion thereof for scarfing the opposed sidewalls of the void as the beam is extracted from the ground; and wherein scarfer is adapted to cut into the surface layer of the opposed sidewalls of the void and to form vertical channels therein as the beam is extracted;

a disposable shoe removably attached to the open bottom portion of the beam, the shoe preventing earthen material from entering the hollow interior portion of the beam while the beam is being inserted into the ground;

the shoe including a pair of spaced-apart upper side wall portions which are adapted to engage the bottom portion of the beam, a relatively narrow lower wall portion, and a pair of inclined wall portions therebetween; and an actuating mechanism interposed between the beam and the shoe for selectively detaching the shoe from the open bottom portion of the beam after the beam has been inserted into the ground so that granular material is released into the void as the beam is extracted therefrom.

33. The apparatus set forth in claim 32, wherein each scarfer comprises a scarfing spur rotatably mounted on supporting lugs secured to the outer faces of the beam, each of the scarfing spurs having at least one radially extending prong disposed to point generally upwardly as the beam is inserted into the ground and is arranged to pivot and project laterally out from the beam as the beam is extracted.

34. The apparatus set forth in claim 33, wherein each of the scarfing spurs includes a generally flat portion adapted to abut the outer face of the beam and limit the rotation of the scarfing spur as the beam is extracted.

35. The apparatus set forth in claim 32 including an opening wedge mounted on the outer face of the beam below each scarfer for substantially shielding the scarfer from vertical forces and bending moments due to reaction with the ground as the beam is inserted.

36. The apparatus set forth in claim 35, wherein each of the opening wedges is generally triangle shaped and slopes upwardly and outwardly from the beam below the scarfer.

37. The apparatus set forth in claim 32, comprising a plurality of scarfers and corresponding scarfing spurs, wherein the scarfing spurs are rotatably mounted in multiple horizontal rows spaced vertically apart on each outer face of the beam with the scarfing spurs located on one row being disposed in staggered relation to the scarfing spurs located on the next vertically spaced row.

38. A method of constructing subterranean walls comprised of granular material, the method comprising the steps of:

(a) suspending a beam above the ground, the beam having a top portion, an open bottom portion, and a hollow interior portion therebetween, the beam also including laterally projecting scarfers, transverse end plate members mounted on either side thereof and extending between the top and bottom portions thereof;

(b) removably installing a disposable shoe onto the open bottom portion of the beam between the transverse end plate members of the beam;

(c) inserting the beam and the removably installed shoe into the ground;

(d) delivering granular material to the hollow interior portion of the beam;

(e) selectively operating an actuating mechanism carried by the beam and interposed between the beam and the shoe to detach the shoe from the bottom portion of the beam; and (f) extracting the beam from the ground to form a void therein while the scarfers cut vertical channels into the sidewalls of the void and granular material flows through the open bottom portion of the beam to fill the void with granular material.

39. The method set forth in claim 38, further comprising the steps of:

(a) re-suspending the beam above the ground;

(b) removably installing an additional disposable shoe on the bottom portion of the beam;

(c) positioning the beam so that it partially overlaps the previously formed void;

(d) inserting the beam and the removably installed additional shoe into the ground to form an overlapping void therein;

(e) delivering granular material to the hollow interior portion of the beam;

(f) selectively operating the actuating mechanism to detach the additional shoe from the bottom portion of the beam; and (g) extracting the beam from the ground while the scarfers cut vertical channels into the sidewalls of the void and granular material flows through the open bottom portion thereof to fill the overlapping void with granular material.

40. The method set forth in claim 39, further comprising the steps of:

repeating steps (a) through (g) of claim 39 a desired number of times to produce a subterranean wall comprised of granular material and defined by successive overlapping voids filled with granular material.

* * * * *